United States Patent
Pilloud et al.

(10) Patent No.: US 12,397,460 B2
(45) Date of Patent: Aug. 26, 2025

(54) SHEET MATERIAL PROCESSING UNIT AND METHODS FOR ASSESSING AN ALIGNMENT

(71) Applicant: BOBST MEX SA, Mex (CH)

(72) Inventors: Francis Pilloud, Clarens (CH); Thomas Hofmann, Genèva (CH); Olivier Fauconneau, Lausanne (CH)

(73) Assignee: BOBST MEX SA, Mex (CH)

( * ) Notice: Subject to any disclaimer, the term of this patent is extended or adjusted under 35 U.S.C. 154(b) by 372 days.

(21) Appl. No.: 18/246,226

(22) PCT Filed: Oct. 1, 2021

(86) PCT No.: PCT/EP2021/077072
§ 371 (c)(1),
(2) Date: Mar. 22, 2023

(87) PCT Pub. No.: WO2022/073861
PCT Pub. Date: Apr. 14, 2022

(65) Prior Publication Data
US 2023/0356422 A1    Nov. 9, 2023

(30) Foreign Application Priority Data
Oct. 9, 2020    (EP) .................................... 20201083

(51) Int. Cl.
*B26D 5/00* (2006.01)
*B26D 7/26* (2006.01)
(52) U.S. Cl.
CPC .......... *B26D 5/007* (2013.01); *B26D 7/2628* (2013.01)

(58) Field of Classification Search
CPC ........ B26D 5/007; B26D 7/2628; B26D 7/18; G01B 11/272
See application file for complete search history.

(56) References Cited

U.S. PATENT DOCUMENTS

2002/0097380 A1* 7/2002 Moulton .............. G11B 27/022
704/E21.02
2009/0254211 A1* 10/2009 Monnin ............. B23Q 17/2266
700/186

(Continued)

FOREIGN PATENT DOCUMENTS

JP          3203147 U      3/2016
KR     20120100256 A      9/2012

(Continued)

*Primary Examiner* — Kenneth M Lo
(74) *Attorney, Agent, or Firm* — Bookoff McAndrews, PLLC

(57) ABSTRACT

A sheet material processing unit (10) is described. It comprises an upper tool (18) and a lower tool (14), wherein the upper tool (18) and the lower tool (14) are configured to interact with each other in order to process sheet material (26). Furthermore, a camera unit (40) is provided which is arranged such that it is able to simultaneously capture a portion of the upper tool (18) comprising a first opening (28) and a portion of the lower tool (14) lying behind the first opening (28) for aligning the tools (14, 18). The sheet material processing unit (10) additionally comprises a first and a second set of light sources which are distinct from one another and are configured for subsequently illuminating the portions to be captured. Moreover, methods for assessing an alignment of the upper tool (18) with respect to the lower tool (14) and with respect to the sheet material (26) are presented.

16 Claims, 6 Drawing Sheets

(56) References Cited

U.S. PATENT DOCUMENTS

Figure 1:
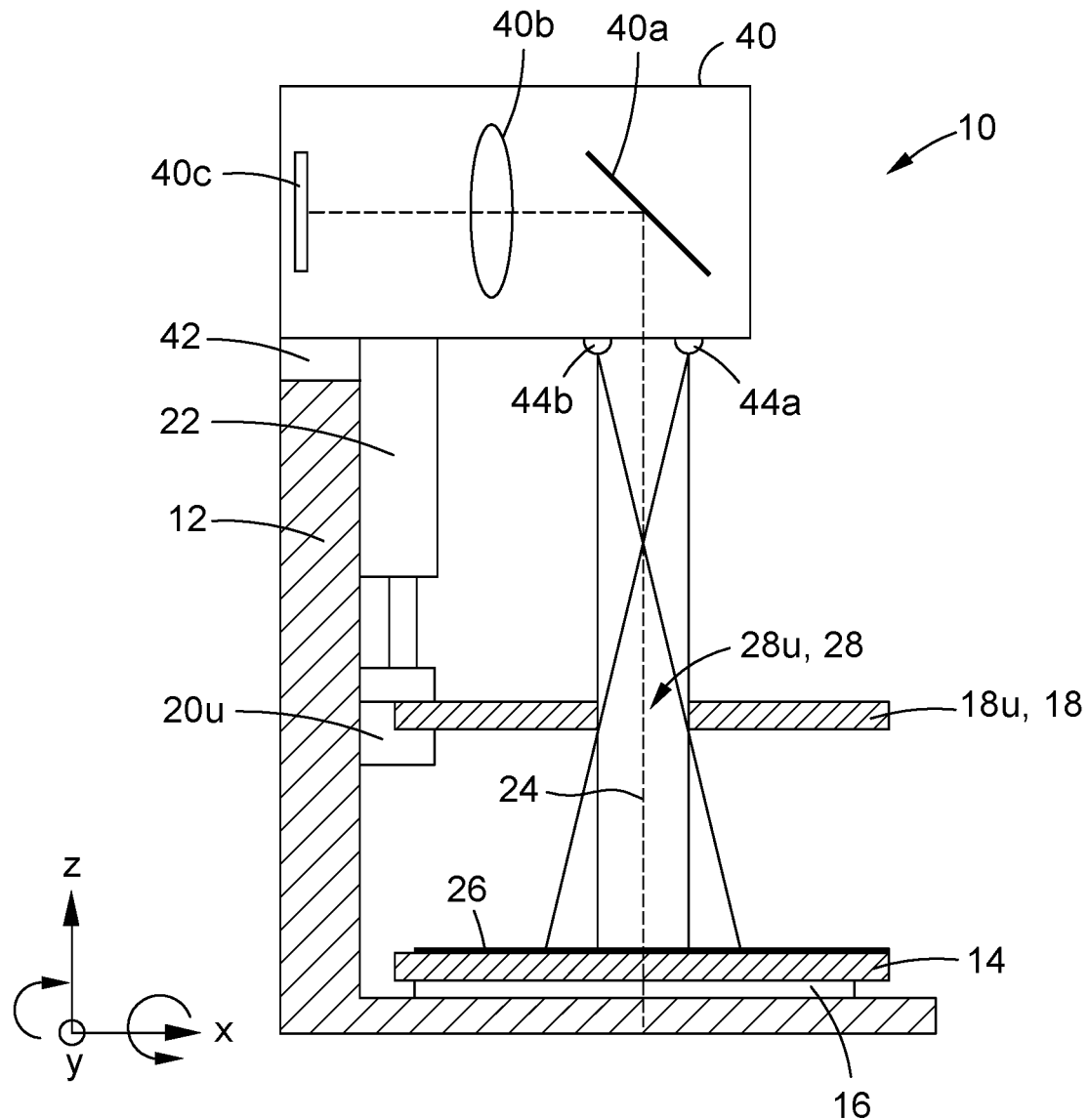

| | | | |
|---|---|---|---|
| 2011/0027542 A1 | 2/2011 | Nagai et al. | |
| 2013/0010081 A1* | 1/2013 | Tenney | H04N 13/20 348/47 |
| 2015/0314334 A1* | 11/2015 | Ackley | G01N 21/85 209/583 |
| 2018/0046062 A1* | 2/2018 | Fisher | H04N 23/62 |
| 2021/0045854 A1* | 2/2021 | Culp | B23K 26/103 |
| 2022/0224833 A1* | 7/2022 | Cier | H04N 23/53 |
| 2023/0332949 A1* | 10/2023 | Wu | H04N 25/50 |

FOREIGN PATENT DOCUMENTS

| | | |
|---|---|---|
| TW | 200849452 A | 12/2008 |
| TW | I395287 B | 5/2013 |
| WO | 2017194197 A1 | 11/2017 |

* cited by examiner

SHEET MATERIAL PROCESSING UNIT AND METHODS FOR ASSESSING AN ALIGNMENT

CROSS-REFERENCE TO RELATED APPLICATION(S)

This application is a National Stage Application under 35 U.S.C. § 371 of International Application No. PCT/EP2021/077072, filed Oct. 1, 2021, which claims priority to European Application No. 20201083.1, filed on Oct. 9, 2020, the entireties of which are incorporated herein by reference.

The invention relates to a sheet material processing unit, especially for processing paper sheets, cardboard sheets or plastic sheets for packaging. The sheet material processing unit comprises a frame, an upper tool and a lower tool, wherein the upper tool and the lower tool are configured to interact with each other in order to process sheet material. The upper tool and the lower tool are mounted on the frame via a respective upper alignment unit and a respective lower alignment unit for aligning the upper tool and the lower tool with respect to each other and with respect to the sheet material to be processed. The upper tool comprises a first opening. Furthermore, a camera unit is arranged such that it is able to simultaneously capture a portion of the upper tool comprising the first opening and a portion of the lower tool lying behind the first opening for aligning the upper tool and the lower tool.

The invention also relates to a method for assessing an alignment of the upper and the lower tool of a sheet material processing unit as mentioned above with respect to each other.

Additionally, the invention is directed to a method for assessing an alignment of the upper tool of a sheet material processing unit of the type mentioned above with respect to a sheet material arranged therein.

Such sheet material processing units and corresponding methods are known. In this context, sheet material processing units can also be called sheet material processing stations. Exemplary sheet material processing units or stations are stripping stations for removing the waste from a cut sheet material or blanking station for removing respective blanks from the cut sheet material.

In order to reliably deliver products of a desired quality, the upper tool and the lower tool need to be aligned with respect to each other. The alignment makes sure that the upper tool and the lower tool interact with each other in a desired manner. Consequently, the relevant configuration for the alignment is when the upper tool and the lower tool are in interaction or engagement. The alignment of the upper tool and the lower tool with respect to each other also avoids undesired wear on the tools.

Furthermore, the tools, i.e. the upper tool and the lower tool, need to be aligned with respect to the sheet material to be processed in order to be able to precisely process the sheet material.

The alignment is done by an upper alignment unit coupled to the upper tool and a lower alignment unit coupled to the lower tool. Both alignment units are configured for adjusting a position of the respective tool within a process plane, substantially corresponding to the plane where the sheet material is located during processing. Sometimes this kind of adjustment is designated as an adjustment in an X direction and a Y direction. Furthermore, the alignment units are configured for aligning the respective tools rotationwise, i.e. the tools can be rotated around a Z direction within a predefined interval. The Z direction is perpendicular to the X direction and to the Y direction. The Z direction is also perpendicular to the process plane. Such alignment units are known.

It is obvious that the alignment needs to take place before the processing of the sheet material starts. This means that the alignment is at least necessary when one of the tools is changed and/or before a new job is started. Of course, also a so-called intermediate alignment is possible, i.e. an alignment not related to a tool change or job change.

The first opening is provided on the upper tool. It is understood that the lower tool lying behind the first opening can only be captured by the camera unit if the sheet material is eliminated from the sheet material processing unit. This configuration is suitable for aligning the upper tool and the lower tool with respect to each other. In case a sheet material is present in the sheet material processing unit, i.e. between the upper tool and the lower tool, the camera unit can only capture an image of the upper tool and the sheet material. This configuration is necessary for aligning the tools with respect to the sheet material to be processed.

Since the alignment is based on images captured by the camera unit, the alignment accuracy depends on the quality of the images. The image quality relates to the suitability of the image for accurately assessing the alignment using the image. It includes the sharpness, the resolution and the visibility of alignment marks and/or edges. Up to a certain degree the image quality is dependent on the optical properties of the surfaces of the tools and/or the surface of the sheet material which are captured in order to perform the alignment.

An objective of the present invention is therefore to generally improve the accuracy of alignment by enhancing the image quality. Especially the dependency from the optical properties of the surfaces involved in capturing the images shall be reduced.

Another objective of the invention is to improve the stability and repeatability of the imaging process, and thus the repeatability of the alignment assessment.

The problem is solved by a sheet material processing unit of the type mentioned above, which comprises a first set of light sources comprising at least one light source for illuminating the portions to be captured and a second set of light sources comprising at least one light source for illuminating the portions to be captured. The first and second sets of light sources are distinct from one another and are configured for subsequently illuminating the portions to be captured. The light sources are for example LEDs (light-emitting diodes). By illuminating the portions to be captured of the upper tool, the lower tool and/or the sheet material the quality of the corresponding images is improved. Moreover, independence from environmental conditions is achieved at least as far as illumination is concerned. As a consequence thereof, the alignment can be performed with high precision. When using the two distinct sets of light sources for subsequently illuminating the portions to be captured, i.e. first illuminating the portions to be captured by the first set of light sources only and subsequently illuminating the portions to be captured by the second set of light sources only, the image quality can be further enhanced. This is especially true when capturing an image in each of the above illumination conditions and combining the information contained in both images. In doing so, undesired reflections, for example of very glossy surfaces, can be compensated. At a given location, such reflections may only be present in one of the illumination conditions. Thus, features of the captured images otherwise not detectable can be detected from the combination of the at least two images. Consequently, the accuracy of alignment is further enhanced.

Preferably, the first and second sets of light sources are disjoint (or equivalently separate) from one another, i.e. they do not have any light source in common.

A basic idea underlying the present invention can be summarized as replacing one single image captured under given illumination conditions by at least two images captured under different, specifically created illumination conditions. The information contained in the at least two images is combined. The different illumination conditions especially lead to different distributions of light and shade in the at least two images. By combining these images the effects of undesired reflections or deflections is compensated.

Of course, in other variants, more than two distinct (or disjoint) sets of light sources can be used, e.g. four sets of light sources. Each set of light sources is used for creating a specific illumination condition and an image is captured for each of the illumination conditions. Thereafter, the information contained in the images is combined.

In the present context the camera unit is understood as a system for capturing images. Consequently, the camera unit may also comprise additional optical components, e.g. lenses or mirrors. The mirrors are especially suitable for tilting optical axes such that the camera unit may be fitted in confined spaces.

In a preferred embodiment, the sets of light sources are arranged on the camera unit. Consequently, the camera unit and the sets of light sources form a structural unit which is compact and can be mounted within the sheet material processing unit with low effort.

It is additionally preferred that both the upper tool and the lower tool are exchangeable tools, i.e. both the upper tool and the lower tool can be replaced by other tools for performing other jobs. The sheet material processing unit can therefore be used for performing a wide variety of jobs.

Preferably, a first marker is provided on the portion of the lower tool lying behind the first opening. The first marker is preferably realized as a feature on the surface of the lower tool which can be easily detected by the camera unit. This allows for fast and precise alignment since the alignment relies on the marker instead of less prominent surface features.

The camera unit may be movably supported on the frame via a linear drive unit, such that the camera unit is displaceable along a width of the upper tool. The width may correspond to a transversal direction of the sheet material processing unit, i.e. a direction which is oriented perpendicular to a travelling direction of the sheet material to be processed. Consequently, the camera can be moved to a suitable position for capturing images used for alignment. As a consequence thereof, the quality of the images and the accuracy of alignment are enhanced. The movably supported camera unit also renders the sheet material processing unit flexible with respect to different tools used therein. Different kinds of tools may provide the respective first opening in varying positions. The camera unit can always be moved to a position in which high quality images can be captured.

According to an embodiment, a second opening is provided on the upper tool comprising the first opening. The camera unit can be moved by the linear drive unit such that it is able to simultaneously capture a portion of the upper tool comprising the second opening and a portion of the lower tool lying behind the second opening. Thus, the upper tool comprises two openings, i.e. the first opening and the second opening. For aligning the upper tool and the lower tool with respect to each other and for aligning the upper tool with respect to the sheet material to be processed, the camera unit can capture images at two positions respectively corresponding to the first opening and the second opening. This leads to increased alignment precision. Especially, capturing images in two positons allows for pivotal alignment of the upper tool and the lower tool, e.g. rotation around the Z direction, with respect to each other or with respect to a sheet material to be processed. When using only images captured in one position, only positions along the X direction and the Y direction can be measured. In this case it has to be assumed that there is no pivotal mis-alignment.

It is also possible that a second marker is provided on the portion of the lower tool lying behind the second opening. Also the second marker is preferably realized as a feature on the surface of the lower tool which can be easily detected by the camera unit. This allows for fast and precise alignment since the alignment relies on the marker instead of less prominent surface features.

As has been explained before, the alignment of the upper tool and the lower tool with respect to each other is vital when the upper tool and the lower tool are in interaction or in engagement. However, during a job change, the upper and lower tool must be aligned prior to being used, that is, prior to be in interaction or in engagement. According to an aspect of this invention, a calibration method using a calibration marker is provided. The calibration allows calculating the position of the upper tool with respect to the lower tool when both tools are in engagement from the position of the upper tool with respect to the lower tool when both tools are dis-engaged. In other words, the calibration can predict the position of the upper tool in its lower, engaged position from the position of the upper tool in its upper, dis-engaged position. The calibration method is performed during a setup phase of the machine.

In a case where no calibration data is available, it is assumed that a position of the upper tool along a X direction and along a Y direction being measured in the upper, dis-engaged position is equal to the X and Y position of the upper tool in the lower, engaged position.

According to a variant, a calibration marker is positioned on the upper tool or on a corresponding tool holder to which the upper tool is attached. The calibration marker is detectable by the camera unit, especially wherein a surface of the calibration marker is made from a material which reflects light in a diffuse manner. In other variants more than one calibration marker are used, e.g. four calibration markers spread over the upper tool. A material which reflects light in a diffuse manner produces less disturbing reflections than other materials. As a consequence thereof, the quality of the images captured by the camera unit is improved.

The calibration marker is associated with the upper tool which is movable for processing the sheet material.

Due to the calibration marker an alignment in the engaged position of the upper and lower tool can be achieved while capturing the corresponding images in a non-engaged position of the tools. The upper tool is in an upper position when being non-engaged in a lower position when being engaged. To this end the tools are first moved in interaction or engagement and an image of the calibration marker is captured. Thereafter, the tools are moved to a position which is used for the alignment and again an image of the calibration marker is captured. When analyzing the two images of the calibration markers, the coordinates of the engagement position of the tools are exactly known with respect to the position of the tools in which the alignment is performed. These coordinates, or more generally the calibration results, can be used for the alignment. Thus, the calibration marker leads to high alignment precision.

According to a variant, the calibration uses a first calibration image, with the upper tool in its upper position, and a second calibration image, where the upper tool is in an intermediate position. The upper position of the upper tool corresponds to the position used for the alignment method. The intermediate position is lower than the upper position but still higher than the engagement position. The X and Y coordinate of the upper tool in the engagement position can be extrapolated from the X and Y position of the upper tool in the intermediate position by using the respective heights (i.e. the Z position) of the upper, intermediate, and lower position combined with the X-Y position of the upper tool in its upper position. To ensure enough precision, the (vertical) travel of the upper tool between the upper position and the intermediate position should be at least 30% and preferably 80% of the total travel between the upper position and the lower position.

The calibration marker may comprise a plurality of marker elements being arranged according to a predefined layout. The marker elements are for example spots or other relatively simple geometrical elements. They are for example arranged in a rectangular array of known mesh size. In a preferred example thirty-six marker elements are arranged in a square array of six by six markers. For such a calibration marker a position in a three-dimensional space is easily detectable by a camera unit. If the position of the camera unit is known, the position of the calibration marker within a detection plane can be derived from a position of the calibration marker in the image. A position of the calibration marker along a direction Z, perpendicular to the detection plane, can be derived by analyzing the deviation of the mesh size in the image from the known mesh size. In other words, a zoom factor or scale of the marker is analyzed. Consequently, the calibration marker allows for precisely detecting the position of the associated tool.

A cover may be provided for selectively covering and uncovering the calibration marker. This measure avoids that the marker gets covered with dust or other undesired particles. In keeping the marker as cleans as possible the accuracy and speed of its detection can be maintained on a high level.

The upper tool comprises at least one, but preferably several calibration markers.

Advantageously, the upper tool is connected to a vertical drive unit and the lower tool is substantially fixed within the frame such that the upper tool is movable with respect to the lower tool along a vertical direction for processing sheet material. Such a configuration of tools has been proven to be well suitable for processing sheets. In this context, the fact that the lower tool is fixed is directed to the operational state of the sheet material processing unit. This means that the fixed tool is still movable for the purpose of alignment.

According to a preferred embodiment, the first set of light sources consists of a single light source and the second set of light sources consists of a single light source. Such sets of light sources are structurally simple and robust.

Furthermore, the problem is solved by a method for assessing an alignment of the upper tool and the lower tool of a sheet material processing unit according to the invention with respect to each other, comprising the following steps:
  a) positioning the camera unit such that it is able to simultaneously capture a portion of the upper tool comprising the first opening and a portion of the lower tool lying behind the first opening,
  b) activating the first set of light sources comprising at least one light source, whereas the remaining sets of light sources are not activated, and capturing a first image of the portion of the upper tool comprising the first opening and a portion of the r lower tool lying behind the first opening and comprising a first marker,
  c) activating the second set of light sources comprising at least one light source, whereas the remaining sets of light sources are not activated, and capturing a second image of the portion of the upper tool comprising the first opening and the portion of the lower tool lying behind the first opening and comprising the first marker,
  d) identifying a position of at least two edges of the first opening by conjointly analyzing the first image and the second image and deriving a position of the upper tool comprising the first opening from the position of the at least two edges,
  e) identifying a position of the first marker by conjointly analyzing the first image and the second image and deriving a position of the lower tool comprising the first marker from the position of the first marker, and
  f) calculating a position offset between the position of the upper tool and the position of the lower tool.

It is understood that the method is performed without sheet material being present in the sheet material processing unit, especially between the upper tool and the lower tool. The activation of the first set of light sources and the second set of light sources creates different illumination conditions. Some of the features of the portions to be captured may be better visible or detectable in one illumination condition than in the other. Consequently, the positions of the at least two edges and the position of the first marker can be identified with high accuracy and reliability. Consequently, the position of the upper tool and the lower tool may also be derived with high accuracy and reliability. Therefore, the position offset which can be considered a quality indicator of alignment can be determined with high precision. This position offset can be used for deciding if one of the tools shall be moved in order to improve the alignment. Since the alignment defines a relative orientation of the upper tool and the lower tool with respect to each other, it is technically sufficient that one of the tools is equipped with an alignment unit. However, as will be explained later, it is preferred that both tools are provided with an alignment unit. The method is performed when the toolset is still, at each change of tools. In doing so, proper alignment of the upper tool and the lower tool with respect to each other is guaranteed. The method can be performed in a fully automated manner. Also a subsequent alignment of the tools can be fully automatic.

Furthermore, the problem is solved by a method for assessing an alignment of the upper tool of a sheet material processing unit according to the invention with respect to a sheet material arranged therein, comprising the following steps:
  a) positioning the camera unit such that it is able to simultaneously capture a portion of the upper tool comprising the first opening and a portion of the sheet material lying behind the first opening,
  b) activating a first set of light sources comprising at least one light source, whereas the remaining sets of light sources are not activated, and capturing a first image of a portion of the upper tool comprising the first opening and a portion of the sheet material lying behind the first opening and comprising a sheet marker,
  c) activating a second set of light sources comprising at least one light source, whereas the remaining sets of light sources are not activated, and capturing a second image of the portion of the upper tool comprising the first opening and the portion of the sheet material lying behind the first opening and comprising the sheet marker, d) identifying a position of at least two edges of the first opening by conjointly analyzing the first image and the second image and deriving a position of the upper tool comprising the first opening from the position of the at least two edges, e) identifying a position of the sheet marker by conjointly analyzing the first image and the second image and deriving a position of the sheet material from the position of the sheet marker, and f) calculating a position offset between the position of the upper tool comprising the first opening and the position of the sheet material.

It is understood that the method can only be performed with a sheet material being present in the sheet material processing unit. The sheet marker can be cut, stamped or printed. Preferably, the sheet marker is cut. The activation of the first set of light sources and the second set of light sources creates different illumination conditions. Some of the features of the portions to be captured may be better visible or detectable in one illumination condition than in the other. Consequently, the position of the at least two edges and the position of the sheet marker can be identified with high accuracy and reliability. Consequently, the position of the upper tool may also be derived with high accuracy and reliability. The same applies to the position of the sheet material. Therefore, the position offset which can be considered a quality indicator of alignment can be determined with high precision. This position offset can be used for deciding if the tools shall be moved with respect to the sheet material in order to improve the alignment. To this end, both the upper tool and the lower tool are equipped with respective alignment units which are suitable for moving the tools with respect to the sheet material without moving the tools with respect to each other. The method is performed when the toolset is still, at each change of tools. In doing so, proper alignment of the upper tool and the lower tool with respect to the sheet material is guaranteed. The method can be performed in a fully automated manner. Also a subsequent alignment of the tools can be fully automatic.

In a case where the edges of the first opening are straight, identifying a position of at least two edges has the advantage that a position along the X direction and a position along the Y direction may be determined. The same result, i.e. a position along the X direction and a position along the Y direction, may be achieved by identifying a single curved edge. Thus, two portions of a curved edge are to be considered two edges in the sense of the present application.

Both methods may be performed with the upper tool in an upper, dis-engaged positon thereof, wherein an alignment of the upper tool associated with a lower, engaged position thereof is calculated using a calibration result. As has already been explained in conjunction with the sheet material processing unit according to the invention, the calibration result essentially comprises coordinates of the lower position of the upper tool with respect to an upper position thereof. In other words, the calibration result comprises a spatial difference or a vector between the upper position and the lower position. Consequently, an alignment associated with the lower position can be easily derived from an alignment assessed in the upper position by using the calibration results. The calibration result is especially generated by using the below method steps.

Preferably, in an activated state the first set of light sources comprising at least one light source and/or the second set of light sources comprising at least one light source illuminate the upper tool and the lower tool or the sheet material such that at least one edge of the first opening casts a shadow on the portion lying below the first opening. As a consequence thereof, the edge can be detected with high precision. This is due to the fact that the shadow resulting directly adjacent to the edge appears as a dark area in the captured image whereas a portion adjacent to the edge of the respective tool comprising the first opening appears as a bright area in the captured image. Alternatively, the illumination can also be configured such that two edges cast a shadow on the portion lying below the first opening. Such edges are preferably neighboring edges. In both alternatives the edges and thus the position of the corresponding tool can be detected with high precision.

In a variant a second opening is provided on the upper tool comprising the first opening and the methods are performed while the camera unit is positioned such that it is able to simultaneously capture a portion of the upper tool comprising the second opening and a portion lying behind the second opening. Preferably, in combination with such a second opening, a second marker is provided on the portion of the lower tool lying behind the second opening and/or a further sheet marker is provided on the sheet material lying behind the second opening. The second opening provides essentially the same effects and advantages which have already been explained in conjunction with the first opening. However, when using both the first and the second opening for assessing the alignment of the upper tool and the lower tool with respect to each other or for assessing the alignment of the upper tool with respect to a sheet material, the accuracy of detection can be further enhanced. In other words, when using the first opening and the second opening, the alignment is assessed at two different positions.

The sheet material processing unit according to the invention may be calibrated, especially before step a) is performed, the calibration comprising the following steps:

a) moving the upper tool to an upper position thereof and capturing a calibration marker associated with the upper tool with the camera unit, wherein the calibration marker comprises a plurality of marker elements being arranged in accordance with a predefined layout, b) calculating a first position of the calibration marker in a horizontal plane associated with the upper position of the upper tool, c) moving the upper tool to an intermediate position thereof and capturing the calibration marker associated with the upper tool with the camera unit, d) calculating a second position of the calibration marker in a horizontal plane associated with the intermediate position of the upper tool, and e) calculating a calibration result comprising a vector connecting the first position and the second position.

The calculation of the position of the upper tool being associated with the calibration marker has already been explained in detail in conjunction with the sheet material processing unit according to the invention. Thus, a position of the calibration marker can be detected in a three-dimensional space. The effects and advantages mentioned in conjunction with the sheet material processing unit also apply to the method steps for calibration.

On this basis also an angle may be calculated by which an actual direction of movement between the intermediate position and the upper position of the upper tool deviates from an optical axis of the camera. As has been explained before, when capturing an image of the calibration marker in the upper position and in the intermediate position, a spatial difference or vector between these positions can be calculated. This spatial difference can also be called a calibration result. It can be used for predicting a lower position of the upper tool if an upper position of the upper tool is known.

Calibration can be done once after having mounted the sheet material processing unit. Preferably, it is also done from time to time, e.g. regularly, as needed for ensuring the smooth operation of the sheet material processing unit.

Preferably, the calibration is performed at a plurality of positions of the camera unit, wherein a calibration marker is provided for each of the positions. For example, the calibration uses four, six or nine calibration markers and is performed at four, six or nine respective positions. In doing so, the accuracy of calibration is further enhanced.

Figure 2:
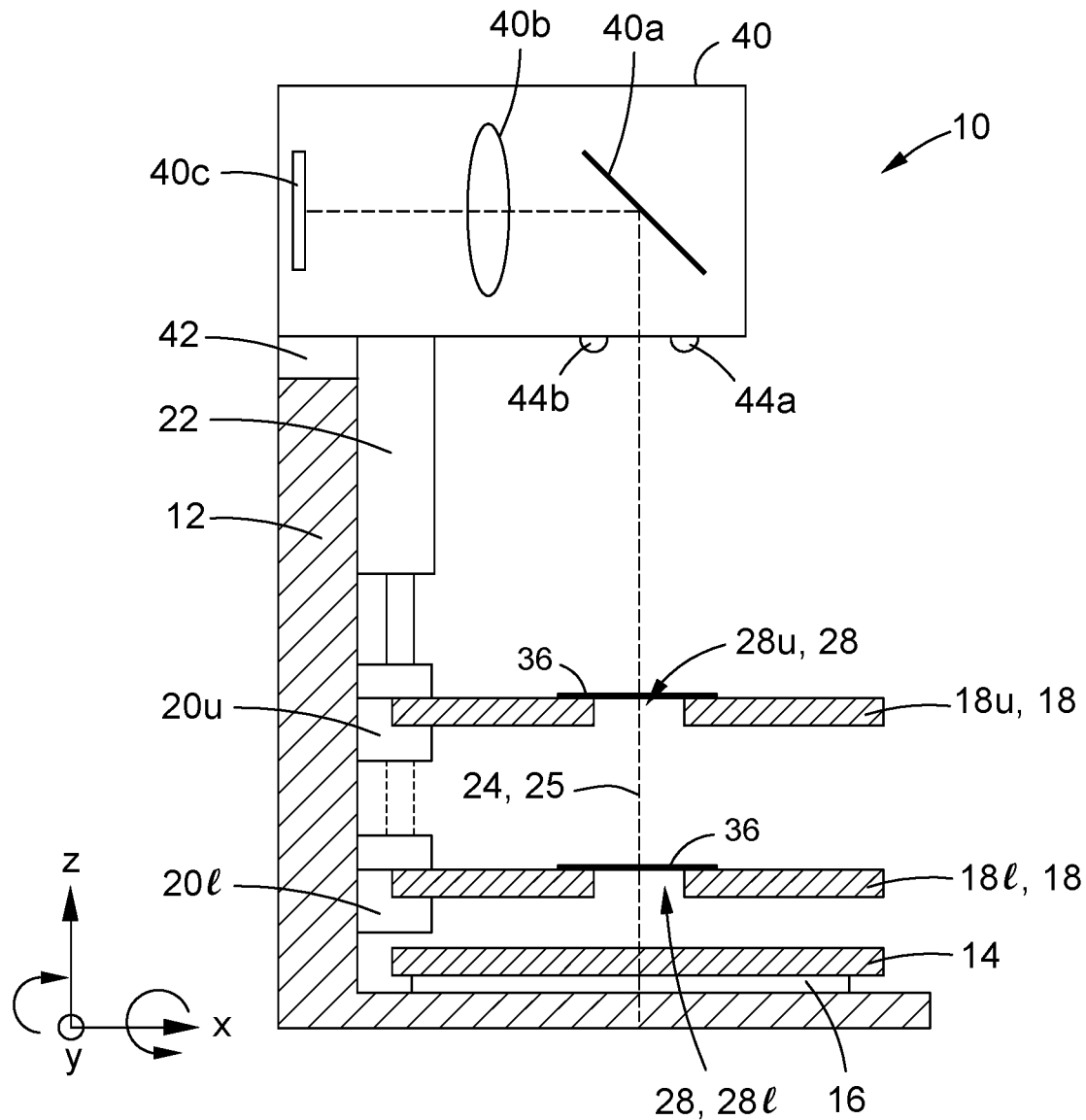
Figure 3:
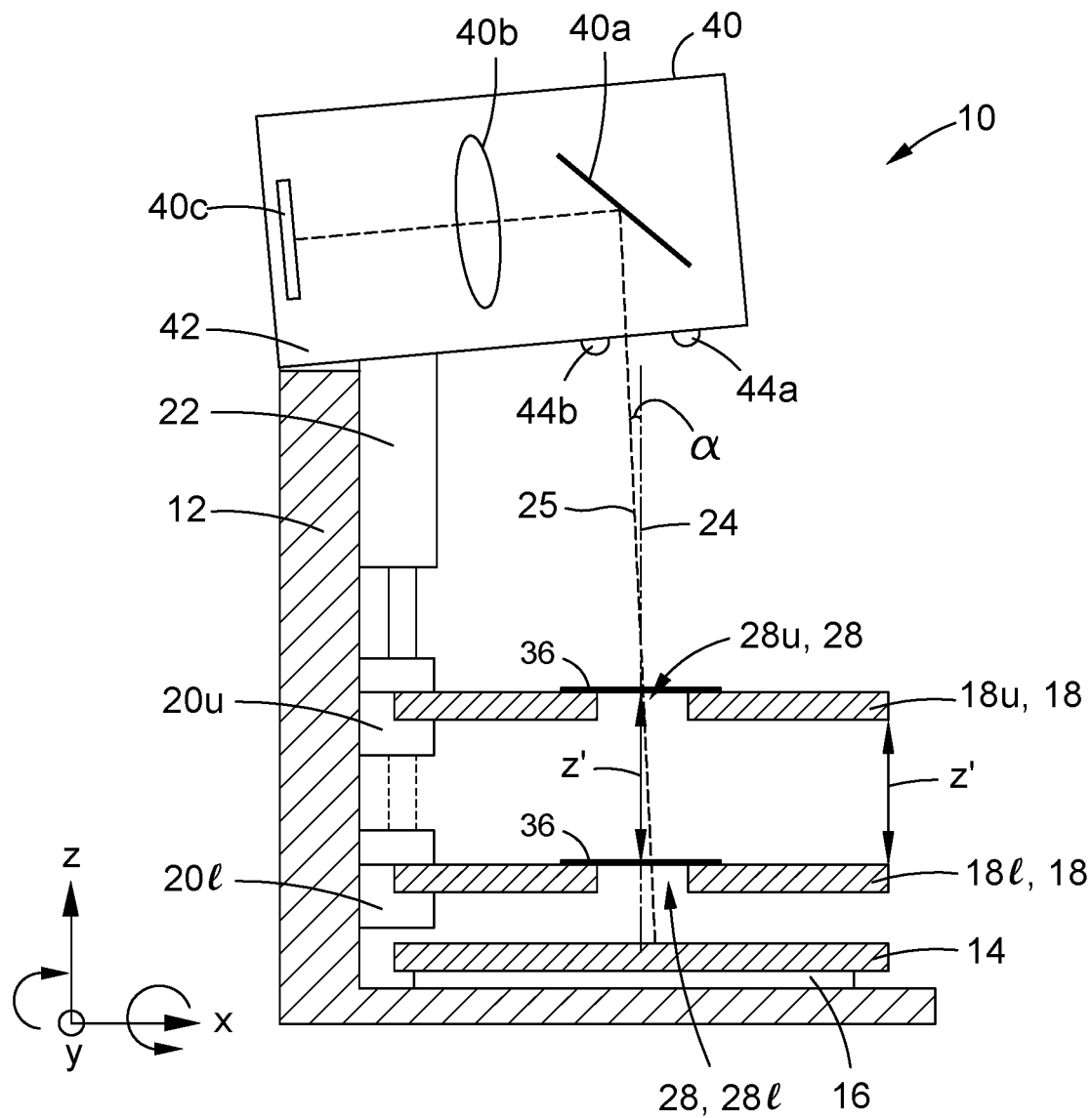
Figure 4:
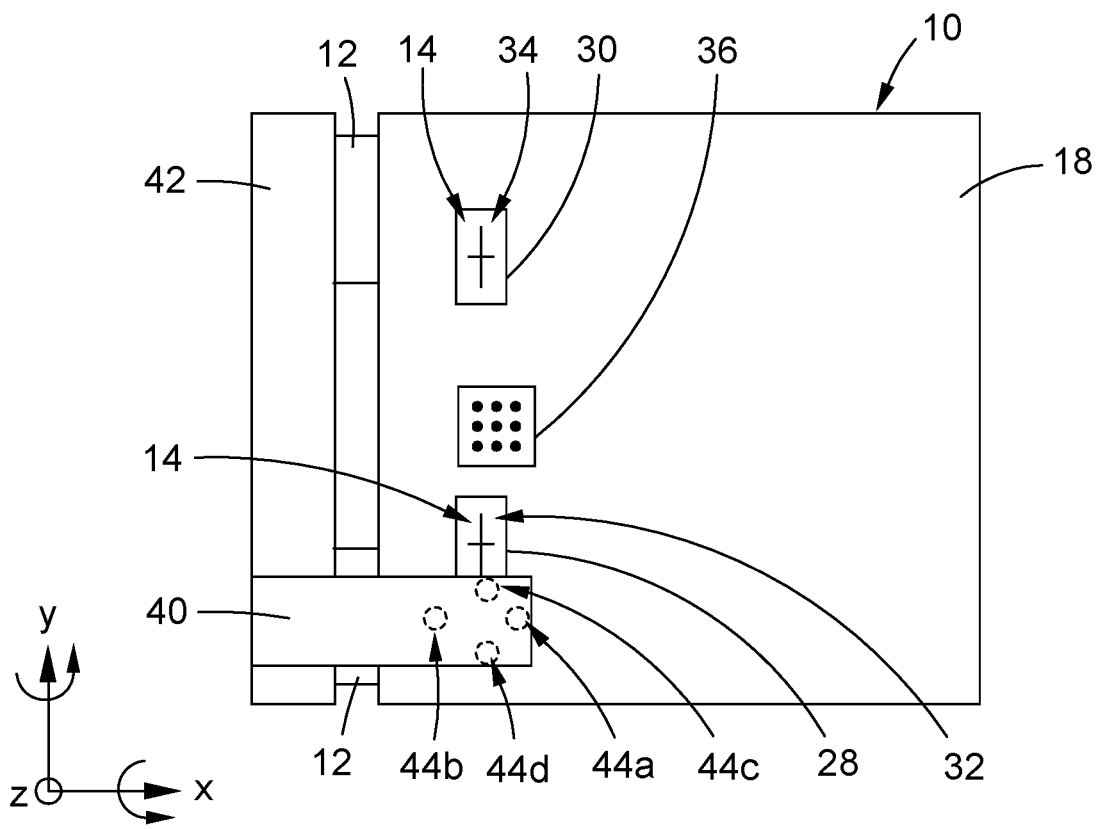
Figure 5:
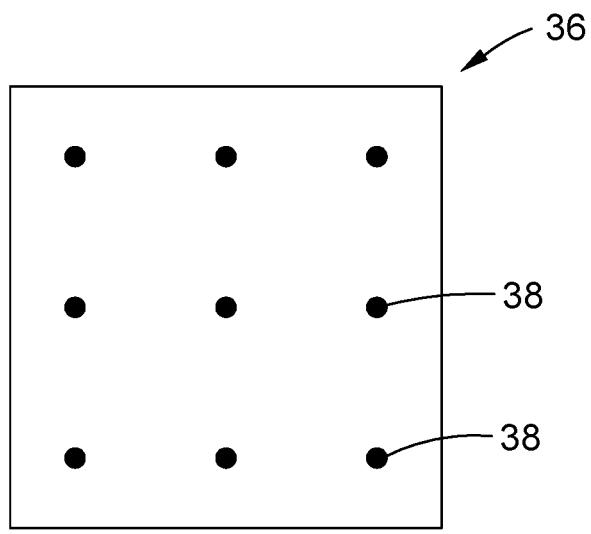
Figure 6:
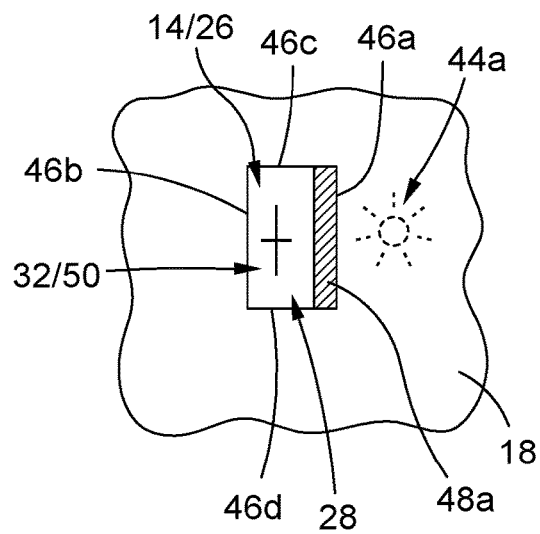
Figure 7:
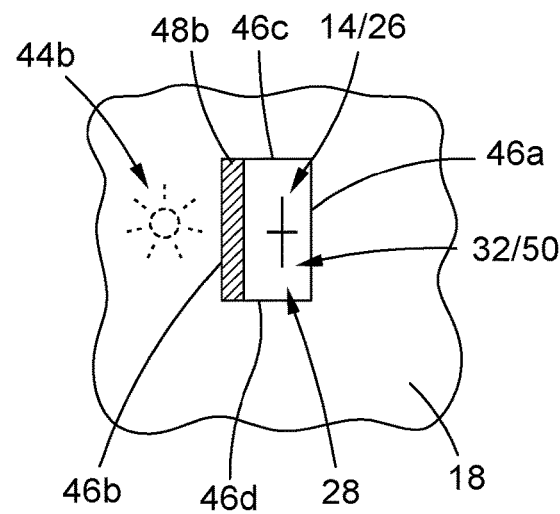
Figure 8:
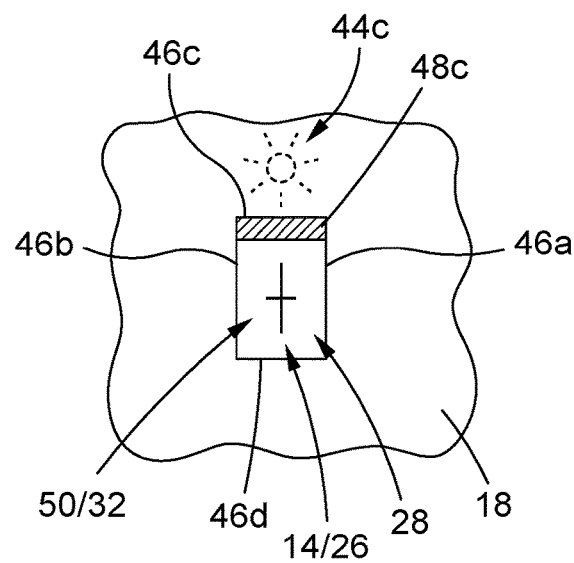
Figure 9:
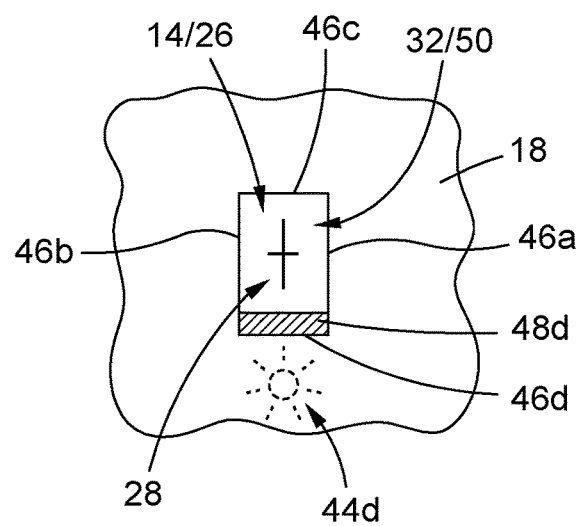
Figure 10:
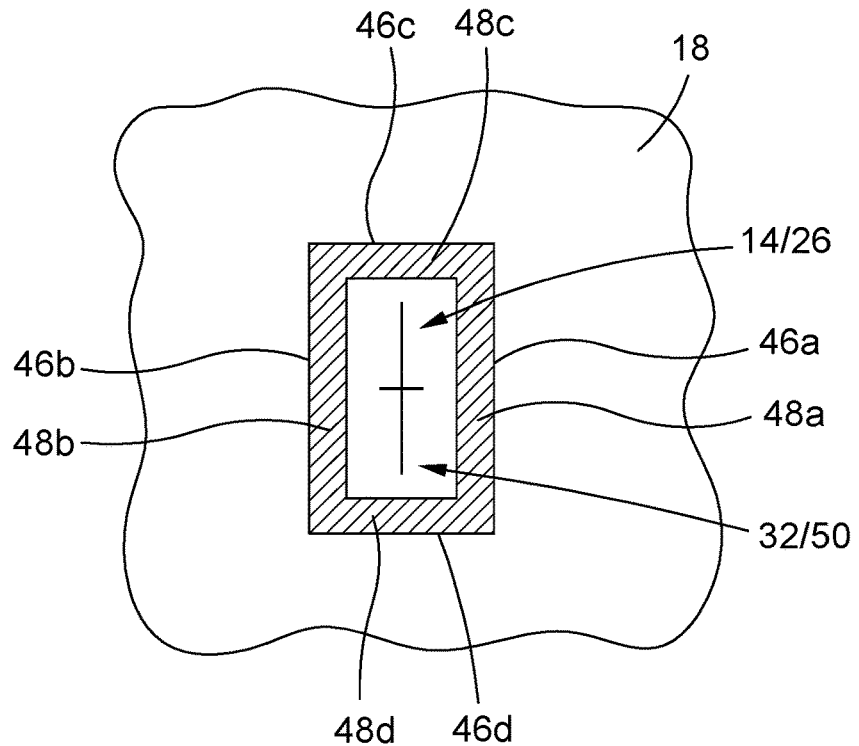
Figure 11:
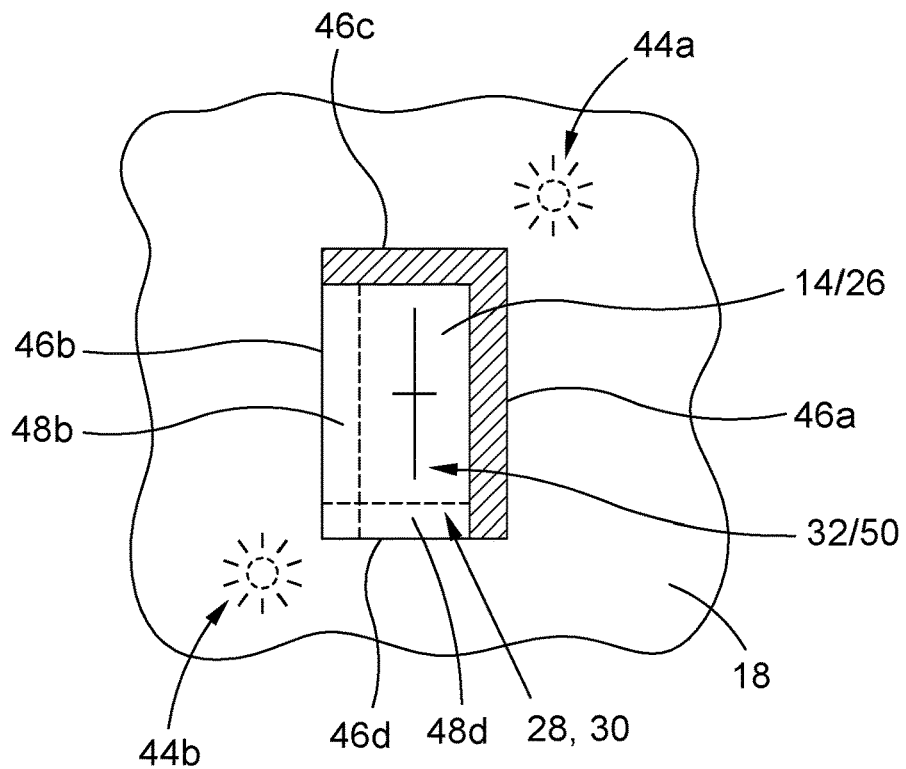

Advantageously, the intermediate position of the upper tool is a lower position of the upper tool. In other words, the intermediate position corresponds to the position in which the upper tool and the lower tool are in engagement. The invention will now be described with reference to the enclosed drawings. In the drawings, FIG. 1 schematically shows a sheet material processing unit according to the invention in a partially cut side view, wherein an upper tool thereof is represented in an upper position, wherein a sheet material is arranged within the sheet material processing unit and wherein the upper tool casts a shadow on the sheet material, FIG. 2 schematically shows a sheet material processing unit according to the invention in a partially cut side view, wherein an upper tool thereof carries a calibration marker, and wherein an angle between the actual direction of movement between a lower position and an upper position of the upper tool cannot be distinguished from the optical axis of the camera unit, FIG. 3 schematically shows the sheet material processing unit of FIG. 2 wherein the mis-alignment of the actual direction Z' of movement between the lower position and the upper position of the upper tool and the optical axis of the camera unit is exaggerated for illustration purposes, FIG. 4 schematically shows the sheet material processing unit of FIG. 1 in a top view, wherein the sheet material has been eliminated, FIG. 5 shows a calibration marker of the sheet material processing unit of FIGS. 1 to 4 in an isolated representation, FIG. 6 shows a portion of an upper tool and a portion of a lower tool of the sheet material processing unit of FIGS. 1 to 4 in a first illumination condition, FIG. 7 shows a portion of an upper tool and a portion of a lower tool of the sheet material processing unit of FIGS. 1 to 4 in a second illumination condition, FIG. 8 shows a portion of an upper tool and a portion of a lower tool of the sheet material processing unit of FIGS. 1 to 4 in a third illumination condition, FIG. 9 shows a portion of an upper tool and a portion of a lower tool of the sheet material processing unit of FIGS. 1 to 4 in a fourth illumination condition, FIG. 10 shows a combined image of a portion of an upper tool and a portion of a lower tool of the sheet material processing unit of FIGS. 1 to 4, wherein the first to fourth illumination conditions have been combined, and FIG. 11 shows a portion of an upper tool and a portion of a lower tool of a sheet material processing unit according to an alternative embodiment.

FIGS. 1 to 4 show a sheet material processing unit 10, which in the present example is a stripping station for cardboard sheets.

The sheet material processing unit 10 comprises a frame 12.

A lower tool 14 is mounted on the frame via a lower alignment unit 16.

Apart from a possible movement resulting from the alignment unit 16 the lower tool 14 is fixed within the frame 12.

Furthermore, an upper tool 18 is mounted on the frame 12 via an upper alignment unit 20.

The upper tool 18 is further connected to a vertical drive unit 22 such that the upper tool 18 is movable with respect to the lower tool 14 along a vertical direction 24 for processing an exemplary sheet material 26 placed on the lower tool 14 (cf. FIG. 1).

In FIGS. 2 and 3 the upper tool 18 and associated components are represented in an upper position and in a lower position. In order to discern both positions, the components represented in their upper position are designated with a suffix u and the components in their lower position are designated with a suffix l.

The upper tool 18 and the lower tool 14 are configured to interact with each other in order to process the sheet material 26, in the present example in order to perform a stripping operation. Since stripping per se is known in the art, a detailed description will be omitted.

The upper tool 18 and the lower tool 14 may be aligned with respect to each other and with respect to the sheet material 26. To this end the alignment units 16, 20 can be used which allow to move the respective tools 14, 18 along a X direction and a Y direction within a predefined interval. Moreover, the alignment units 16, 20 allow for a rotation of the respective tools 14, 18 around the Z direction.

Moreover, the upper tool 18 comprises a first opening 28 which has a substantially rectangular shape (cf. FIG. 4).

Additionally, a second opening 30 is provided on the upper tool 18. The second opening 30 also has a substantially rectangular shape which is substantially identical to the shape of the first opening 28. However, the second opening 30 is shifted along the Y direction with respect to the first opening 28 (cf. FIG. 4).

When taking a position above the upper tool 18, the lower tool 14 is visible through the first opening 28 and the second opening 30.

On the portion of the lower tool 14 lying behind the first opening 28 a first marker 32 is provided.

On the portion of the lower tool 14 lying behind the second opening 30 a second marker 34 is provided.

Both the first marker 32 and the second marker 34 are optically detectable markers.

In the examples shown the first marker 32 and the second marker 34 are formed as crosses.

The calibration marker 36 is substantially square and comprises a plurality of marker elements 38 being arranged according to a predefined layout. In the example shown the calibration marker 36 comprises nine marker elements 38 which are arranged in a square array with constant mesh size. For better legibility only some of the marker elements 38 are designated with a reference sign (cf. FIG. 5).

Moreover, a surface of the calibration marker is made from a material which reflects light in a diffuse manner.

The sheet material processing unit 10 also comprises a camera unit 40 which is movably supported on the frame 12 via a linear drive unit 42 (cf. FIG. 4), such that the camera unit 40 is displaceable along a width of the upper tool 18 and the lower tool 14 which corresponds to the Y direction.

In the present embodiment, the camera unit 40 comprises a mirror 40a for redirecting incoming light beams which are substantially oriented along the vertical direction 24 onto a lens 40b.

The lens 40b is located adjacent to the mirror 40a in a substantially horizontal direction. An image detector 40c is positioned behind the lens and receives the light beams transmitted by the lens 40b.

As will be explained in connection with the methods for alignment, the camera unit 40 can be arranged such that it is able to simultaneously capture a portion of the upper tool 18 comprising the first opening 28 and a portion of the lower tool 14 lying behind the first opening 28 comprising the first marker 32.

Moreover, the camera unit 40 can be moved to a position where it is able to simultaneously capture a portion of the upper tool 18 comprising the second opening 30 and a portion of the lower tool 14 lying behind the second opening 30 and comprising the second marker 34.

Moreover, the calibration marker 36 can be detected by the camera unit 40.

Furthermore, the sheet material processing unit 10 comprises four disjoint sets of light sources each comprising exactly one light source 44a, 44b, 44c, 44d for illuminating portions to be captured by the camera unit 40.

In the following, each of the light sources 44a, 44b, 44c, 44d will represent the corresponding set of light sources.

Please note that we use disjoint sets of light sources in this example, but we might more generally use four distinct set of light sources, each set sharing some light sources with its neighboring set. In practice this might happen when using a ring of LEDs, where each illumination represents slightly more than a quarter of the ring (the same reasoning applies when using the ring as two sets of light sources).

The light sources 44a, 44b, 44c, 44d are configured for subsequently illuminating these portions, i.e. they are not activated at the same time. This will be explained in the following with reference to the methods according to the invention.

In order to produce high quality process results, i.e. in order to precisely and reliably strip the sheet material 26, the upper tool 18 and the lower tool 14 need to be precisely aligned, when the upper tool 18 is in its lower position. It is only in this position that the upper tool 18 and the lower tool 14 interact with each other. Moreover, the upper tool 18 and the lower tool 14 need to be carefully aligned with the sheet material 26 to be processed.

However, it has been found that it is more convenient to assess an alignment when the upper tool 18 is in its upper position rather than in its lower position.

This is possible, if the sheet material processing unit 10 is properly calibrated.

To this end the upper tool 18 is moved to an intermediate position which in the example shown corresponds to its lower position and an image of the calibration marker 36 is captured by the camera unit 40.

Since the position of the camera unit 40 is known, a position of the calibration marker 36 within a plane extending in the X direction and the Y direction can be calculated by analyzing the captured image.

Moreover, a vertical position of the calibration marker 36, i.e. a position of the calibration marker 36 in the Z direction, can be calculated by analyzing the captured image in combination with the known position of the camera unit and the known predefined layout. Since the layout is known, a zoom factor can be calculated by analyzing the image and the position along the z direction can be derived from the zoom factor.

Subsequently, the upper tool 18 is moved to its upper position and an image of the calibration marker 36 is captured by the camera unit 40.

Also in this position of the upper tool 18, a position of the calibration marker 36 within a plane extending in the X direction and the Y direction can be calculated by analyzing the captured image in combination with the known position of the camera unit 40.

As before, also a position of the calibration marker 36 in the Z direction can be calculated by analyzing the captured image in combination with the known position of the camera unit and the known predefined pattern.

Using the above positions, a spatial difference between the upper position and the lower position of the upper tool 18 can be calculated. The spatial difference may be expressed in the form of a vector.

It is also possible to calculate an angle $\alpha$ by which an actual direction of movement Z' between the lower position and the upper position of the upper tool 18 deviates from the optical axis 25 by evaluating the above positions (cf. FIG. 3).

As a result of this calibration, a lower position of the upper tool 18 can be calculated based on a known upper position thereof.

It is understood that in the present example only one calibration marker 36 is provided and thus the calibration is performed at one position of the camera unit 40 only. However, it is understood that the calibration steps as mentioned above may also be performed at a plurality of positions of the camera unit 40, wherein a calibration marker 36 is provided for each of the positions.

Once the calibration is done, an alignment of the upper tool 18 and the lower tool 14 with respect to each other can be assessed while the upper tool 18 is in its upper position. As has been explained before, a lower position of the upper tool 18 can be calculated using the above calibration result. For the alignment the lower position is actually relevant.

The camera unit 40 is positioned such that it is able to simultaneously capture a portion of the upper tool 18 comprising the first opening 28 and a portion of the lower tool 14 lying behind the first opening 28. This portion of the lower tool 14 comprises the first marker 32.

Then a first light source 44a is activated, whereas the remaining light sources 44b, 44c, 44d are not activated. Thus, the first light source 44a illuminates the upper tool 18 and the lower tool 14 such that one edge 46a of the first opening 28 casts a shadow 48a on the portion of the lower tool 14 lying below the first opening 28 (cf. FIG. 6).

A first image is captured by the camera unit 40 comprising the first opening 28 and the portion of the lower tool 14 lying below it and comprising the first marker 32.

Subsequently, a second light source 44b is activated, whereas the remaining light sources 44a, 44c, 44d are not activated. Thus, the second light source 44b illuminates the upper tool 18 and the lower tool 14 such that one edge 46b of the first opening 28 casts a shadow 48b on the portion of the lower tool 14 lying below the first opening 28 (cf. FIG. 7).

A second image is captured by the camera unit 40 comprising the first opening 28 and the portion of the lower tool 14 lying below it and comprising the first marker 32.

After that, a third light source 44c is activated, whereas the remaining light sources 44a, 44b, 44d are not activated. Thus, the third light source 44c illuminates the upper tool 18 and the lower tool 14 such that one edge 46*c* of the first opening 28 casts a shadow 48*c* on the portion of the lower tool 14 lying below the first opening 28 (cf. FIG. 8).

A third image is captured by the camera unit 40 comprising the first opening 28 and the portion of the lower tool 14 lying below it and comprising the first marker 32.

Finally, a fourth light source 44*d* is activated, whereas the remaining light sources 44*a*, 44*b*, 44*c* are not activated. Thus, the fourth light source 44*d* illuminates the upper tool 18 and the lower tool 14 such that one edge 46*d* of the first opening 28 casts a shadow 48*d* on the portion of the lower tool 14 lying below the first opening 28 (cf. FIG. 9).

A fourth image is captured by the camera unit 40 comprising the first opening 28 and the portion of the lower tool 14 lying below it and comprising the first marker 32.

The four images are then conjointly analyzed and respective positions of the edges 46*a*, 46*b*, 46*c*, 46*d* of the first opening 28 are identified. An image combining the four images described above is shown in FIG. 10.

As can be seen in this figure, due to the successive illumination with the four light sources 44*a*, 44*b*, 44*c*, 44*d*, the edges 46*a*, 46*b*, 46*c*, 46*d* can be clearly identified as border lines between relatively bright areas of the upper tool 18 and relatively dark areas of the cast shadows 48*a*, 48*b*, 48*c*, 48*d*.

Thus, a position of the first opening 28 can be derived from these images.

Since the position of the first opening 28 within the upper tool 18 is known, also a position of the upper tool 18 is easily derivable.

Furthermore, also by conjointly analyzing the four images as described above, a position of the first marker 32 can be identified with high precision.

Since the position of the first marker 32 relative to the lower tool 14 is known, a position of the lower tool 14 is easily derivable.

Using the position of the upper tool 18 and the position of the lower tool 14, a position offset between these tools 14, 18 can be calculated.

This position offset is an indicator of the alignment of the upper tool 18 and the lower tool 14 with respect to each other.

In a further step, the camera unit 40 is positioned such that it is able to simultaneously capture a portion of the upper tool 18 comprising the second opening 30 and a portion of the lower tool 14 lying behind the second opening 30. This portion of the lower tool 14 comprises the second marker 34.

To this end the camera unit 40 is moved along the Y direction using the linear drive unit 42.

Thereafter, the procedure of subsequently activating the four light sources 44*a*, 44*b*, 44*c*, 44*d* as has been explained in conjunction with a position of the camera unit 40 associated with the first opening 28 is repeated. Reference is made to the above explanations.

Based thereon, another position offset between the tools 14, 18 is calculated.

If one or both position offsets lie outside a desired range, the alignment of the tools 14, 18 can be adjusted by moving one of the tools 14, 18 or both tools 14, 18 by the respective alignment unit 16, 20.

As a result, the upper tool 18 and the lower tool 14 are aligned with respect to each other.

Now the alignment of the upper tool 18 and the lower tool 14 with respect to the sheet material 26 can be assessed. It is noted that in this context the alignment of the tools 14, 18 with respect to each other is not changed any more. In other words, the relative position of the tools 14, 18 is maintained.

In order to solve this task, the sheet material 26 needs to be placed between the upper tool 18 and the lower tool 14. Thus, when taking a perspective above the upper tool 18 the lower tool 14 is covered by the sheet material 26 and behind the first opening 28 and behind the second opening 30 lie respective portions of the sheet material 26 each comprising a sheet marker 50.

Since the assessment of the alignment of the upper tool 18 and the lower tool 14 with respect to the sheet material 26 is very similar to the alignment of the upper tool 18 and the lower tool 14 with respect to each other, reference will again be made to FIGS. 6 to 10. In this Figures the sheet material 26 is represented as an alternative to the lower tool 14 and one of the sheet markers is represented as an alternative to the first marker 32.

The camera unit 40 is positioned such that it is able to simultaneously capture a portion of the upper tool 18 comprising the first opening 28 and a portion of the sheet material 26 lying behind the first opening 28. This portion of the sheet material 26 comprises the sheet marker 50.

Then, a first light source 44*a* is activated, whereas the remaining light sources 44*b*, 44*c*, 44*d* are not activated. Thus, the first light source 44*a* illuminates the upper tool 18 and the sheet material 26 such that one edge 46*a* of the first opening 28 casts a shadow 48*a* on the portion of the sheet material 26 lying below the first opening 28 (cf. FIG. 6).

A first image is captured by the camera unit 40 comprising the first opening 28 and the portion of the sheet material 26 lying below it and comprising the sheet marker 50.

Subsequently, a second light source 44*b* is activated, whereas the remaining light sources 44*a*, 44*c*, 44*d* are not activated. Thus, the second light source 44*b* illuminates the upper tool 18 and the sheet material 26 such that one edge 46*b* of the first opening 28 casts a shadow 48*b* on the portion of the sheet material 26 lying below the first opening 28 (cf. FIG. 7).

A second image is captured by the camera unit 40 comprising the first opening 28 and the portion of the sheet material 26 lying below it and comprising the sheet marker 50.

After that, a third light source 44*c* is activated, whereas the remaining light sources 44*a*, 44*b*, 44*d* are not activated. Thus, the third light source 44*c* illuminates the upper tool 18 and the sheet material 26 such that one edge 46*c* of the first opening 28 casts a shadow 48*c* on the portion of the sheet material 26 lying below the first opening 28 (cf. FIG. 8).

A third image is captured by the camera unit 40 comprising the first opening 28 and the portion of the sheet material 26 lying below it and comprising the sheet marker 50.

Finally, a fourth light source 44*d* is activated, whereas the remaining light sources 44*a*, 44*b*, 44*c* are not activated. Thus, the fourth light source 44*d* illuminates the upper tool 18 and the sheet material 26 such that one edge 46*d* of the first opening 28 casts a shadow 48*d* on the portion of the sheet material 26 lying below the first opening 28 (cf. FIG. 9).

A fourth image is captured by the camera unit 40 comprising the first opening 28 and the portion of the sheet material 26 lying below it and comprising the sheet marker 50.

The four images are then conjointly analyzed and respective positons of the edges 46*a*, 46*b*, 46*c*, 46*d* of the first opening 28 are identified. An image combining the four images described above is shown in FIG. 10.

As can be seen in this figure, due to the successive illumination with the four light sources 44*a*, 44*b*, 44*c*, 44*d*, the edges 46*a*, 46*b*, 46*c*, 46*d* can be clearly identified as border lines between relatively bright areas of the upper tool 18 and relatively dark areas of the cast shadows 48a, 48b, 48c, 48d.

Thus, a position of the first opening 28 can be derived from these images.

Since the position of the first opening 28 within the upper tool 18 is known, also a position of the upper tool 18 is easily derivable.

Furthermore, also by conjointly analyzing the four images as described above, a position of the sheet marker 50 can be identified with high precision.

Since the position of the sheet marker 50 relative to the sheet material 26 is known, a position of the sheet material 26 is easily derivable.

Using the position of the upper tool 18 and the position of the sheet material 26, a corresponding position offset can be calculated.

This position offset is an indicator of the alignment of the upper tool 18 and the lower tool 14 with respect to the sheet material 26.

In a next step, the camera unit 40 is positioned such that it is able to simultaneously capture a portion of the upper tool 18 comprising the second opening 30 and a portion of the sheet material 26 lying behind the second opening 30. This portion of the sheet material 26 also comprises one of the sheet markers 50.

To this end the camera unit 40 is moved along the Y direction using the linear drive unit 42.

Thereafter, the procedure of subsequently activating the four light sources 44a, 44b, 44c, 44d as has been explained in conjunction with a position of the camera unit 40 associated with the first opening 28 is repeated. Reference is made to the above explanations.

Based thereon, another position offset between the upper tool 18 and the sheet material 26 is calculated.

If one or both position offsets lie outside a desired range, the alignment of the tools 14, 18 relative to the sheet material 26 can be adjusted by conjointly moving the tools 14, 18 using the respective alignment units 16, 20.

As a result, the upper tool 18 and the lower tool 14 are aligned with respect to the sheet material 26.

A sheet material processing unit 10 according to an alternative embodiment is illustrated in FIG. 11.

This variant differs from the embodiment as explained before in that only two disjoint sets of light sources each comprising exactly one light source 44a, 44b are provided.

A first light source 44a thereof is configured for illuminating the portion of the upper tool 18 comprising the first opening 28 and the portion of the lower tool 14 or the sheet material 26 lying below the first opening 28 such that two edges 46a, 46c simultaneously cast a shadow 48a, 48c on the lower tool 14 or on the sheet material 26.

A second light source 44b thereof is configured for illuminating the portion of the upper tool 18 comprising the first opening 28 and the portion of the lower tool 14 or the sheet material 26 lying below the first opening 28 such that two edges 46b, 46d simultaneously cast a shadow 48b, 48d on the lower tool 14 or on the sheet material 26.

For the remaining features and the corresponding effects and advantages reference is made to the embodiment shown in FIGS. 1 to 10.

It is noted that in all of the above embodiments the first opening 28 and the second opening 30 are provided in the upper tool 18 and the camera unit 40 is positioned above the upper tool 18. It is clear that this solution can also be kinematically reversed such that the first opening 28 and the second opening 30 are provided on the lower tool 14 and the camera unit 40 is arranged below the lower tool 14.

The invention claimed is:

1. A sheet material processing unit (10) for processing paper sheets, cardboard sheets, or plastic sheets for packaging, the sheet material processing unit comprising:
a frame, an upper tool, and a lower tool, wherein the upper tool and the lower tool are configured to interact with each other in order to process sheet material, the upper tool and the lower tool being mounted on the frame via a respective upper alignment unit and a respective lower alignment unit for aligning the upper tool and the lower tool with respect to each other and with respect to the sheet material to be processed, wherein the upper tool comprises a first opening,
a camera unit being arranged to simultaneously capture a portion of the upper tool comprising the first opening and a portion of the lower tool lying behind the first opening for aligning the upper tool and the lower tool,
a first set of light sources comprising at least one light source for illuminating the portions to be captured, and
a second set of light sources comprising at least one light source for illuminating the portions to be captured,
wherein the first and second sets of light sources are distinct from one another and are configured for subsequently illuminating the portions to be captured.

2. The sheet material processing unit according to claim 1, further comprising:
a first marker provided on the portion of the lower tool lying behind the first opening.

3. The sheet material processing unit according to claim 1, wherein the camera unit is movably supported on the frame via a linear drive unit, such that the camera unit is displaceable along a width of the upper tool.

4. The sheet material processing unit according to claim 3, further comprising:
a second opening is provided on the upper tool comprising the first opening,
wherein the camera unit can be moved by the linear drive unit such that it is able to simultaneously capture a portion of the upper tool comprising the second opening and a portion of the lower tool lying behind the second opening.

5. The sheet material processing unit according to claim 4, further comprising:
a second marker provided on the portion of the lower tool lying behind the second opening.

6. The sheet material processing unit according to claim 1, further comprising:
a calibration marker is positioned on the upper tool or on a corresponding tool holder to which the upper tool is attached, the calibration marker being detectable by the camera unit, especially wherein a surface of the calibration marker is made from a material which reflects light in a diffuse manner.

7. The sheet material processing unit according to claim 6, wherein the calibration marker comprises a plurality of marker elements arranged according to a predefined layout.

8. The sheet material processing unit according to claim 1, wherein the upper tool is connected to a vertical drive unit and the lower tool is substantially fixed within the frame such that the upper tool is movable with respect to the lower tool along a vertical direction for processing the sheet material.

9. The sheet material processing unit according to claim 1, wherein the first set of light sources consists of a single light source and in that the second set of light sources consists of a single light source.

10. A method for assessing an alignment of the upper tool with respect to the lower tool of the sheet material processing unit according to claim 1, the method comprising:
- positioning the camera unit such that it is able to simultaneously capture a portion of the upper tool comprising the first opening and a portion of the lower tool lying behind the first opening,
- activating the first set of light sources comprising at least one light source, whereas the remaining sets of light sources are not activated, and capturing a first image of the portion of the upper tool comprising the first opening and a portion of the lower tool lying behind the first opening and comprising a first marker,
- activating the second set of light sources comprising at least one light source, whereas the remaining sets of light sources are not activated, and capturing a second image of the portion of the upper tool comprising the first opening and the portion of the lower tool lying behind the first opening and comprising the first marker,
- identifying a position of at least two edges of the first opening by conjointly analyzing the first image and the second image and deriving a position of the upper tool comprising the first opening from the position of the at least two edges,
- identifying a position of the first marker by conjointly analyzing the first image and the second image and deriving a position of the lower tool comprising the first marker from the position of the first marker, and
- calculating a position offset between the position of the upper tool and the position of the lower tool.

11. A method for assessing an alignment of the upper tool of a sheet material processing unit according to claim 1 with respect to a sheet material arranged therein, the method comprising:
- positioning the camera unit such that it is able to simultaneously capture a portion of the upper tool comprising the first opening and a portion of the sheet material lying behind the first opening,
- activating the first set of light sources comprising at least one light source, whereas the remaining sets of light sources are not activated, and capturing a first image of a portion of the upper tool comprising the first opening and a portion of the sheet material lying behind the first opening and comprising a sheet marker,
- activating the second set of light sources comprising at least one light source, whereas the remaining sets of light sources are not activated, and capturing a second image of the portion of the upper tool comprising the first opening and the portion of the sheet material lying behind the first opening and comprising the sheet marker,
- identifying a position of at least two edges of the first opening by conjointly analyzing the first image and the second image and deriving a position of the upper tool comprising the first opening from the position of the at least two edges,
- identifying a position of the sheet marker by conjointly analyzing the first image and the second image and deriving a position of the sheet material from the position of the sheet marker, and
- calculating a position offset between the position of the upper tool and the position of the sheet material.

12. The method according to claim 10, wherein the method is performed with the upper tool in an upper positon thereof, and wherein an alignment of the upper tool associated with a lower position thereof is calculated using a calibration result.

13. The method according to claim 10, wherein, in an activated state, the first set of light sources comprising at least one light source and/or the second set of light sources comprising at least one light source illuminates the upper tool and the lower tool or the sheet material such that at least one edge of the first opening casts a shadow on the portion lying below the first opening.

14. The method according to claim 10, wherein a second opening is provided on the upper tool and the method is performed while the camera unit is positioned such that it is able to simultaneously capture a portion of the upper tool comprising the second opening and a portion lying behind the second opening.

15. The method according to claim 10, further comprising:
- calibrating the sheet material processing unit, wherein the calibrating includes:
- moving the upper tool to an upper position thereof and capturing a calibration marker associated with the upper tool with the camera unit, wherein the calibration marker comprises a plurality of marker elements being arranged according to a predefined layout,
- calculating a first position of the calibration marker in a horizontal plane associated with the upper position of the upper tool,
- moving the upper tool to an intermediate position thereof and capturing the calibration marker associated with the upper tool with the camera unit,
- calculating a second position of the calibration marker in a horizontal plane associated with the intermediate position of the upper tool, and
- calculating a calibration result comprising a vector connecting the first position and the second position.

16. The method according to claim 15, wherein the intermediate position of the upper tool is a lower position of the upper tool.

* * * * *